United States Patent
Watanabe (10) Patent No.: US 8,031,817 B2
(45) Date of Patent: Oct. 4, 2011

(54) RECEIVER DEVICE, ERROR DETECTION CIRCUIT, AND RECEIVING METHOD

(75) Inventor: Ryousuke Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 12/117,439

(22) Filed: May 8, 2008

(65) Prior Publication Data

US 2009/0185645 A1    Jul. 23, 2009

Related U.S. Application Data

(63) Continuation of application No. PCT/JP2005/020602, filed on Nov. 10, 2005.

(51) Int. Cl.
*H03D 1/00* (2006.01)

(52) U.S. Cl. .......................... 375/343; 375/316; 375/340

(58) Field of Classification Search ................... 375/343, 375/316, 340
See application file for complete search history.

(56) References Cited

U.S. PATENT DOCUMENTS 6,774,829 B2    8/2004   Nakada et al.
7,450,669 B2 *  11/2008  Mori .............................. 375/343

FOREIGN PATENT DOCUMENTS

| EP | 1 408 664 A2 | 4/2004 |
|---|---|---|
| JP | 11-163824 A | 6/1999 |
| JP | 2000-068974 A | 3/2000 |
| JP | 2000-228656 A | 8/2000 |
| JP | 2001-036495 A | 2/2001 |
| JP | 2001-285245 A | 10/2001 |
| JP | 2002-026864 A | 1/2002 |
| JP | 2004-032030 A | 1/2004 |
| JP | 2004-134883 A | 4/2004 |
| JP | 2005-322955 A | 11/2005 |

* cited by examiner

*Primary Examiner* — Shuwang Liu
*Assistant Examiner* — Michael Neff
(74) *Attorney, Agent, or Firm* — Arent Fox LLP (57) ABSTRACT

A receiver device which is small in scale of circuit configuration yet capable of detecting an error between symbol timing of a received signal and that generated therein and also restraining an error signal from varying due to variation in input level of the received signal. A delayer delays the received signal for one effective symbol period, a correlator calculates a correlation signal from the product of the received signal and the delayed signal, and an integrator calculates an integral value of the correlation signal. First and second accumulative adders accumulatively add up the integral values over respective predetermined periods before and after symbol start timing generated within the receiver device. An error signal generator generates an error signal by normalizing the difference between first and second sums obtained from the first and second accumulative adders, respectively, by means of the sum total of the first and second sums.

13 Claims, 8 Drawing Sheets

RECEIVER DEVICE, ERROR DETECTION CIRCUIT, AND RECEIVING METHOD

This application is a continuing application, filed under 35 U.S.C. §111(a), of International Application PCT/JP2005/020602, filed Nov. 10, 2005.

BACKGROUND OF THE INVENTION

1. Field of the Invention

The present invention relates to receiver devices, error detection circuits, and receiving methods. More particularly, the present invention relates to a receiver device for receiving a signal that has been subjected to Orthogonal Frequency Division Multiplexing (OFDM), an error detection circuit for detecting an error between symbol timing of the received OFDM signal and internal symbol timing of the receiver device, and a method of receiving an OFDM signal.

2. Description of the Related Art

OFDM, which is one of multi-carrier transmission schemes, is tolerant to faults attributable to multipath delay and has begun to be used in terrestrial digital broadcasting and other applications.

Figure 6:
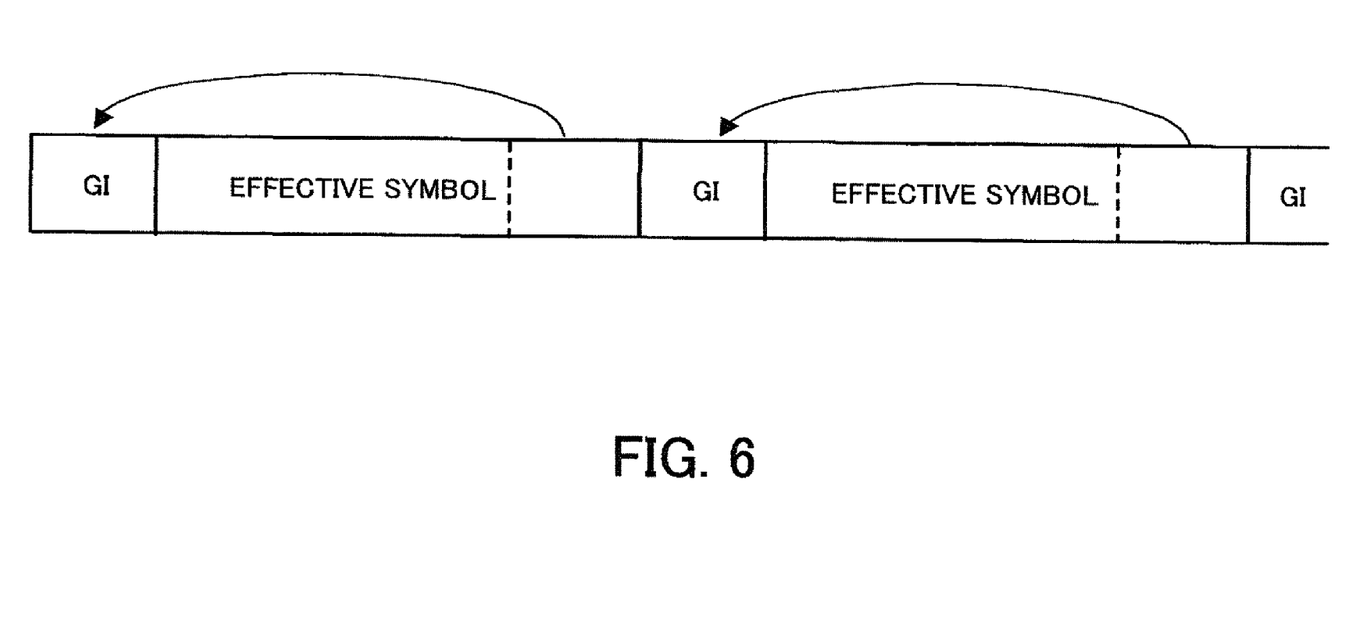
FIG. 6 illustrates an OFDM signal.

FIG. 6 illustrates an OFDM signal.

A receiver device for receiving an OFDM signal carries out Fast Fourier Transform (FFT) with respect to a certain interval, or what is called effective symbol, in the OFDM signal in order to demodulate the received signal. Before each effective symbol, a signal called guard interval (GI) is inserted which is used for removing faults attributable to multipath delay. The guard interval and the succeeding effective symbol constitute one symbol of OFDM signal. The receiver device detects symbol timing from the received signal in the manner described below, by utilizing the fact that the signal inserted in the guard interval is a copy of the tail of the effective symbol.

Figure 7:
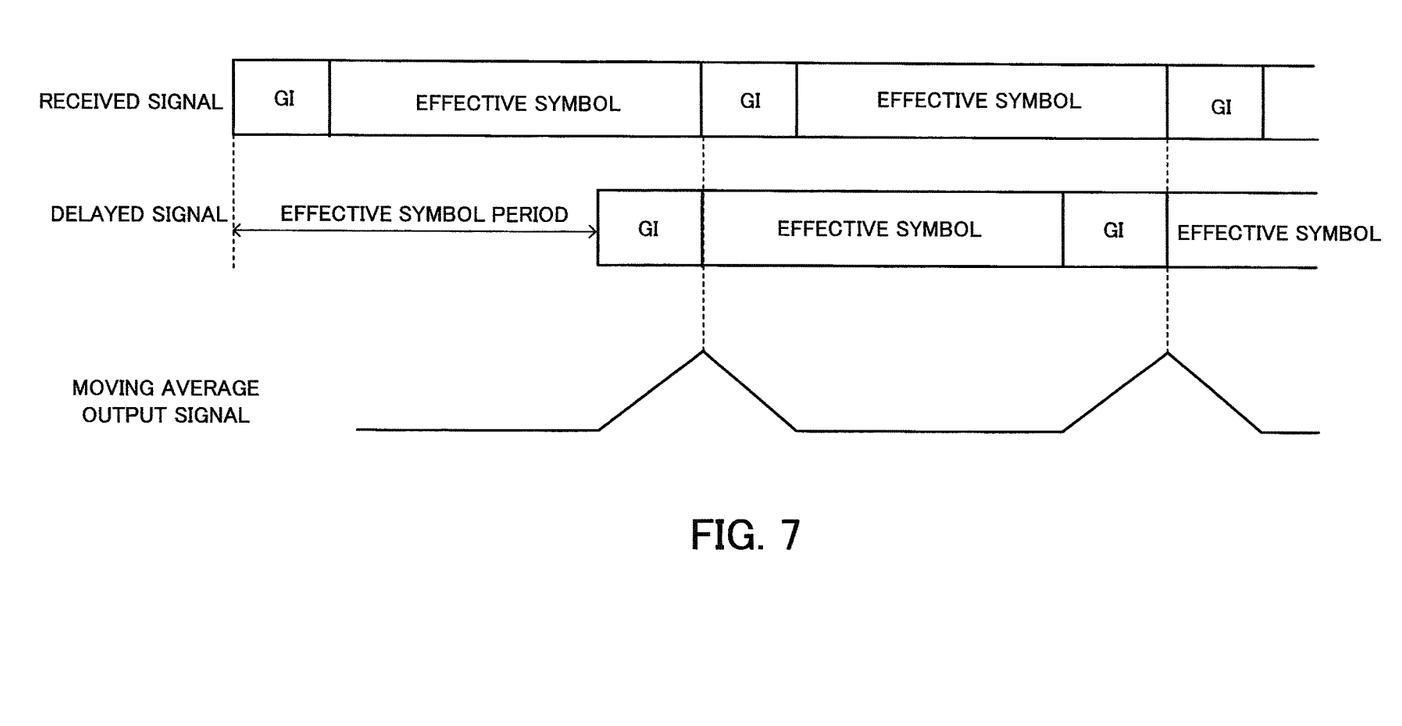
FIG. 7 illustrates a method of detecting symbol timing.

FIG. 7 illustrates a method of detecting symbol timing.

The receiver device delays the received signal for one effective symbol period, then multiplies the received signal and the delayed signal together to obtain a correlation signal, and integrates the correlation signal by using its moving average. As a result, a peak appears at the symbol start position. Thus, the receiver device detects the symbol start position from the peak position, thereby capturing the symbol timing. This process is called symbol timing synchronization.

Following the symbol timing synchronization, the receiver device generates the next symbol start timing by counting the number of samples of the symbol by means of an internal clock, to determine FFT computation timing and the like.

Because of an error in the sampling frequency based on the internal clock of the receiver device, however, the symbol start timing generated within the receiver device occasionally deviates from the peak position of a moving average output signal shown in FIG. 7, causing a timing error.

In conventional receiver devices, the deviation is fed back as an error signal to control the sampling frequency so that the symbol start timing generated within the receiver device may always coincide with the peak position of the moving average output signal.

Also, there has been known a conventional method wherein the timing error is detected by obtaining a difference between areas of the moving average output signal corresponding to predetermined periods before and after the symbol start timing generated within the receiver device.

Figure 8A:
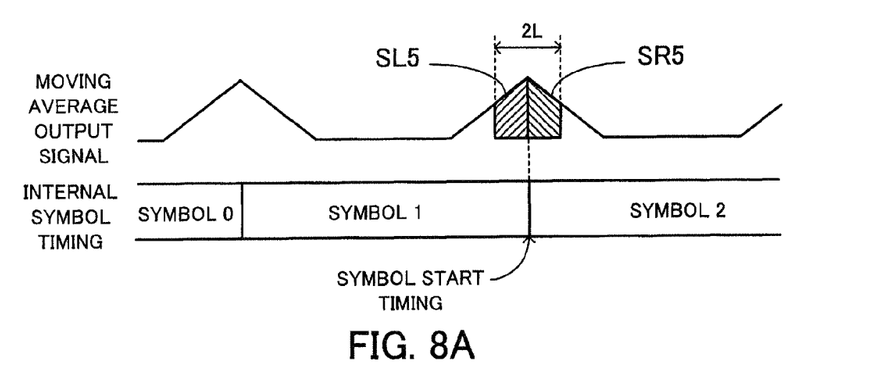
Figure 8B:
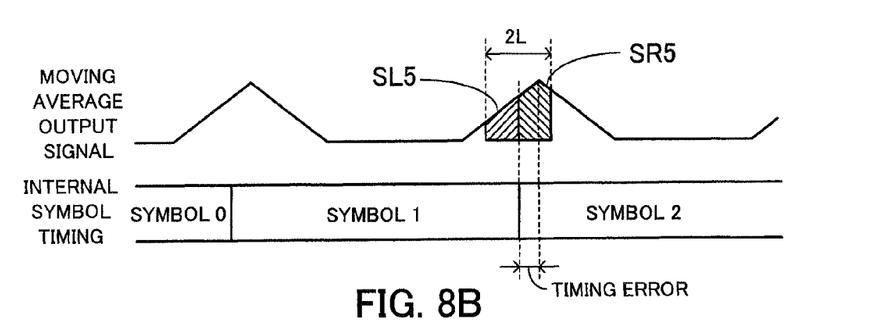
Figure 8C:
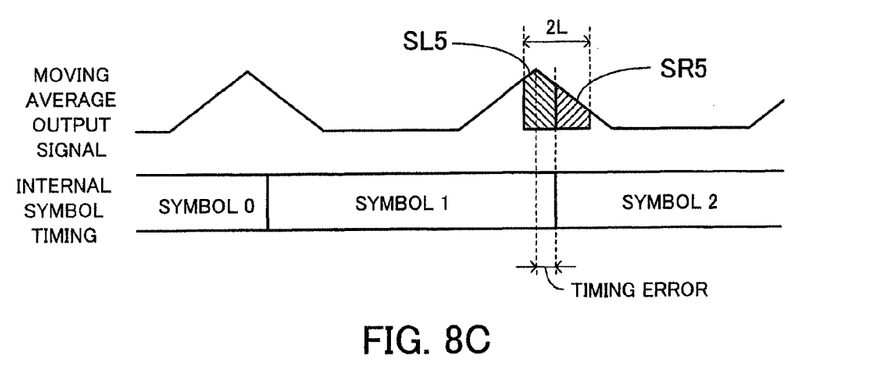

FIGS. 8A to 8C illustrate the method of detecting a timing error based on areas of the moving average output signal. FIG. 8A shows the case where the symbol start timing of the receiver device coincides with that of the received signal, FIG. 8B shows the case where the symbol start timing of the receiver device is earlier than that of the received signal, and FIG. 8C shows the case where the symbol start timing of the receiver device is later than that of the received signal.

Conventionally, a comparison is made between the areas of the moving average output signal corresponding to predetermined periods before and after the symbol start timing of the receiver device. In FIGS. 8A to 8C, SL5 indicates an area of the moving average output signal over the predetermined period before the symbol start timing generated within the receiver device, and SR5 indicates an area of the moving average output signal over the predetermined period after the symbol start timing of the receiver device. Specifically, the areas SL5 and SR5 are each derived as the sum total of L sample values of the moving average output signal. In the figures, 2L denotes an error detection range.

Where the symbol start timing generated within the receiver device coincides with the peak of the moving average output signal (symbol start timing of the received signal) as shown in FIG. 8A, the difference between the areas SL5 and SR5 is zero ("0"), so that no error is detected.

On the other hand, where the symbol start timing generated within the receiver device is earlier than that of the received signal as shown in FIG. 8B, the difference (SL5−SR5) between the areas SL5 and SR5 takes a negative value. Conversely, where the symbol start timing generated within the receiver device is later than that of the received signal as shown in FIG. 8C, the difference (SL5−SR5) between the areas SL5 and SR5 takes a positive value. In the conventional receiver device, the sampling frequency is corrected on the basis of the difference between the areas SL5 and SR5, to thereby correct the timing error of the receiver device.

As such conventional devices configured to obtain the area difference, a receiver device has been known in which an FIR (Finite Impulse Response) filter comprising 2L one-clock delayers is used to obtain the area difference.

However, in the conventional receiver devices wherein the symbol timing error of the receiver device is corrected by using the areas calculated based on the received signal, a large number of adders are required to calculate the area difference, resulting in enlargement of the scale of circuitry.

For example, in the case of the receiver device using the FIR filter comprising 2L one-clock delayers, usually (2L−1) adders are required, giving rise to a problem that widening the error detection range leads to further enlargement in the scale of circuitry.

Also, in the conventional receiver devices wherein the symbol timing error of the receiver device is corrected by using the areas calculated based on the received signal, the detected error signal undergoes variations as the input level of the received signal varies, adversely affecting the stability and convergence of the control system.

SUMMARY OF THE INVENTION

According to an aspect of the invention, the receiver device comprises a delayer for delaying the received signal for one effective symbol period, a correlator for calculating a correlation signal from a product of the received signal and the delayed received signal, an integrator for calculating an integral value of the correlation signal, a first accumulative adder for accumulatively adding up the integral values over a predetermined period preceding symbol start timing generated within the receiver device, a second accumulative adder for accumulatively adding up the integral values over the predetermined period succeeding the symbol start timing, and an error signal generator for generating an error signal by normalizing a difference between a first sum obtained from the first accumulative adder and a second sum obtained from the second accumulative adder by means of a sum total of the first and second sums.

BRIEF DESCRIPTION OF THE DRAWINGS

FIGS. 3A and 3B illustrate how timing error is detected in cases where the symbol timing of the receiver device is deviated from that of the received signal, wherein FIG. 3A shows the case where the symbol timing of the receiver device is advanced, and FIG. 3B shows the case where the symbol timing of the receiver device is retarded.

FIGS. 4A to 4C illustrate how individual signals change when the input level of the received signal varies, wherein FIG. 4A shows change of the received signal, FIG. 4B shows change of a total area (SL1+SR1), and FIG. 4C shows change of an error signal.

FIGS. 8A to 8C illustrate a method of detecting a timing error based on areas of a moving average output signal, wherein FIG. 8A shows the case where symbol start timing of a receiver device coincides with that of a received signal, FIG. 8B shows the case where the symbol start timing of the receiver device is earlier than that of the received signal, and FIG. 8C shows the case where the symbol start timing of the receiver device is later than that of the received signal.

DESCRIPTION OF THE PREFERRED EMBODIMENTS

Preferred embodiments of the present invention will be described in detail below with reference to the accompanying drawings, wherein like reference numerals refer to like elements throughout.

Figure 1:
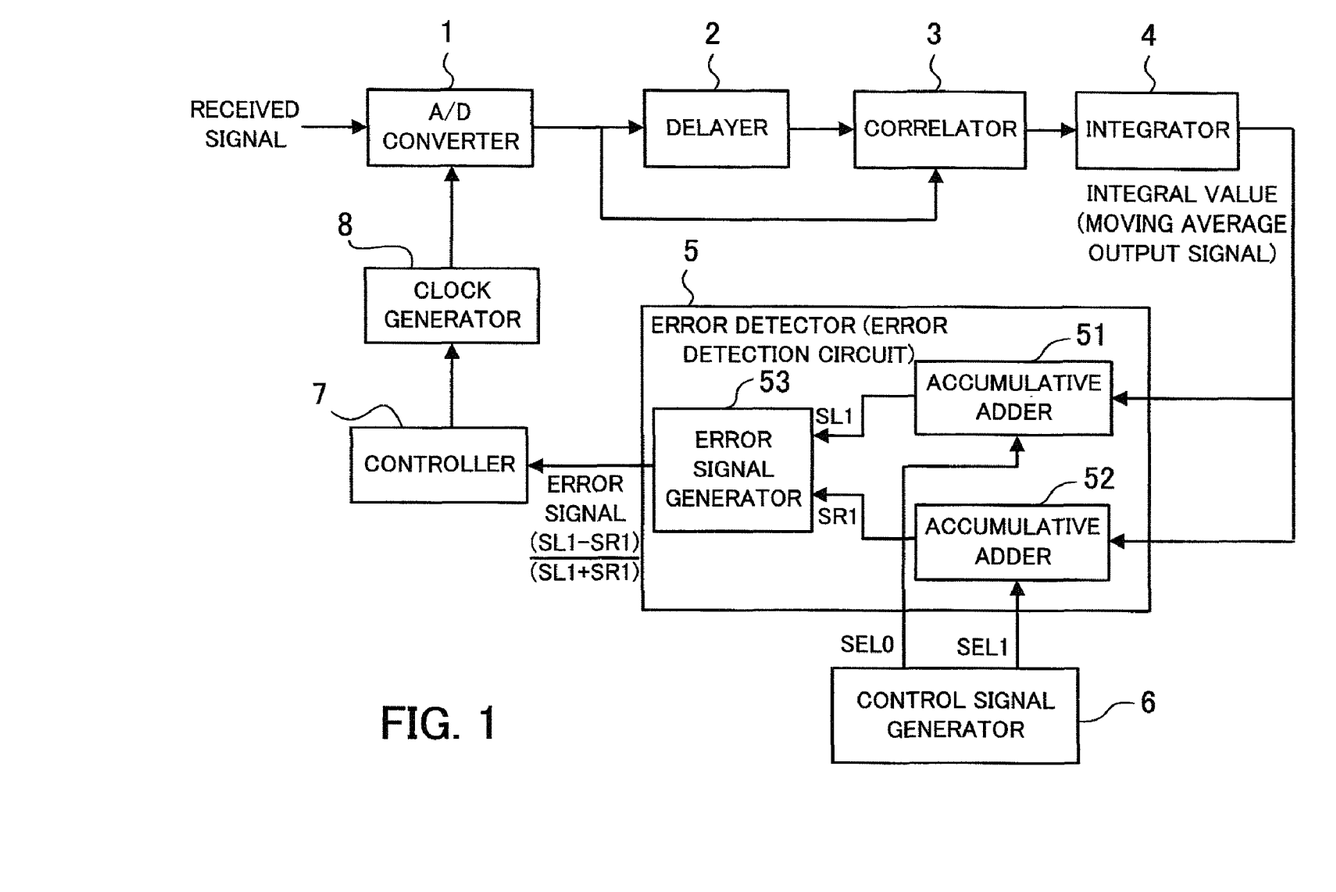
FIG. 1 schematically illustrates the configuration of a principal part of a receiver device according to an embodiment of the invention.

FIG. 1 illustrates a schematic configuration of a principal part of a receiver device according to an embodiment of the invention.

The receiver device of the embodiment comprises an analog/digital (A/D) converter 1, a delayer 2, a correlator 3, an integrator 4, an error detector (error detection circuit) 5, an error detection control signal generator 6, a controller 7, and a clock generator 8.

In FIG. 1, a part of the receiver device for performing symbol timing synchronization is omitted, and the figure shows the configuration of the principal part for detecting an error between the symbol timing already captured in the receiver device and the symbol timing of a signal sequentially received by the receiver device.

The A/D converter 1 subjects an OFDM signal received from a tuner, not shown, to A/D conversion.

The delayer 2 delays the received signal, which has been subjected to A/D conversion by the A/D converter 1, for one effective symbol period.

The correlator 3 calculates a correlation signal by multiplying the received signal by the delayed signal delayed for one effective symbol period.

The integrator 4 integrates the correlation signal by using, for example, its moving average.

The error detector 5, which is a characteristic part of this embodiment, includes accumulative adders 51 and 52, and an error signal generator 53. The accumulative adder 51 accumulatively adds up the integral values (moving average output signal) of the correlation signal over a predetermined period preceding the symbol start timing generated within the receiver device. The accumulative adder 52 accumulatively adds up the integral values over the predetermined period succeeding the symbol start timing. The predetermined periods before and after the symbol start timing are of the same length and equal to, for example, a guard interval length. The error signal generator 53 generates an error signal by normalizing the difference between the sums obtained from the respective accumulative adders 51 and 52 by means of the sum total of the two obtained sums. The circuit configuration of the error detector 5 will be described in detail later.

The error detection control signal generator 6 generates a control signal SEL0 to cause the accumulative adder 51 to perform accumulative addition during the predetermined period preceding the symbol start timing generated within the receiver device, and also generates a control signal SELL to cause the accumulative adder 52 to perform accumulative addition during the predetermined period succeeding the symbol start timing.

The controller 7 operates on the basis of the error signal output from the error detector 5. Specifically, if there is an error between the symbol timing of the received signal and that generated within the receiver device, the controller 7 generates a control signal to control the clock so that the two symbol timings may coincide with each other.

In accordance with the control signal from the controller 7, the clock generator 8 controls the clock frequency to correct the A/D conversion timing of the A/D converter 1 and the sampling frequency used in FFT and the like.

Operation of the receiver device of this embodiment will be now described.

The received signal that has been subjected to A/D conversion by the A/D converter 1 is then delayed for one effective symbol period by the delayer 2. The correlator 3 calculates a correlation signal by deriving the product of the received signal and the delayed received signal. Subsequently, the integrator 4 integrates the correlation signal by using its moving average over the guard interval period, for example, the result of the integration, namely, a moving average output signal, being supplied to the error detector 5.

Figure 2:
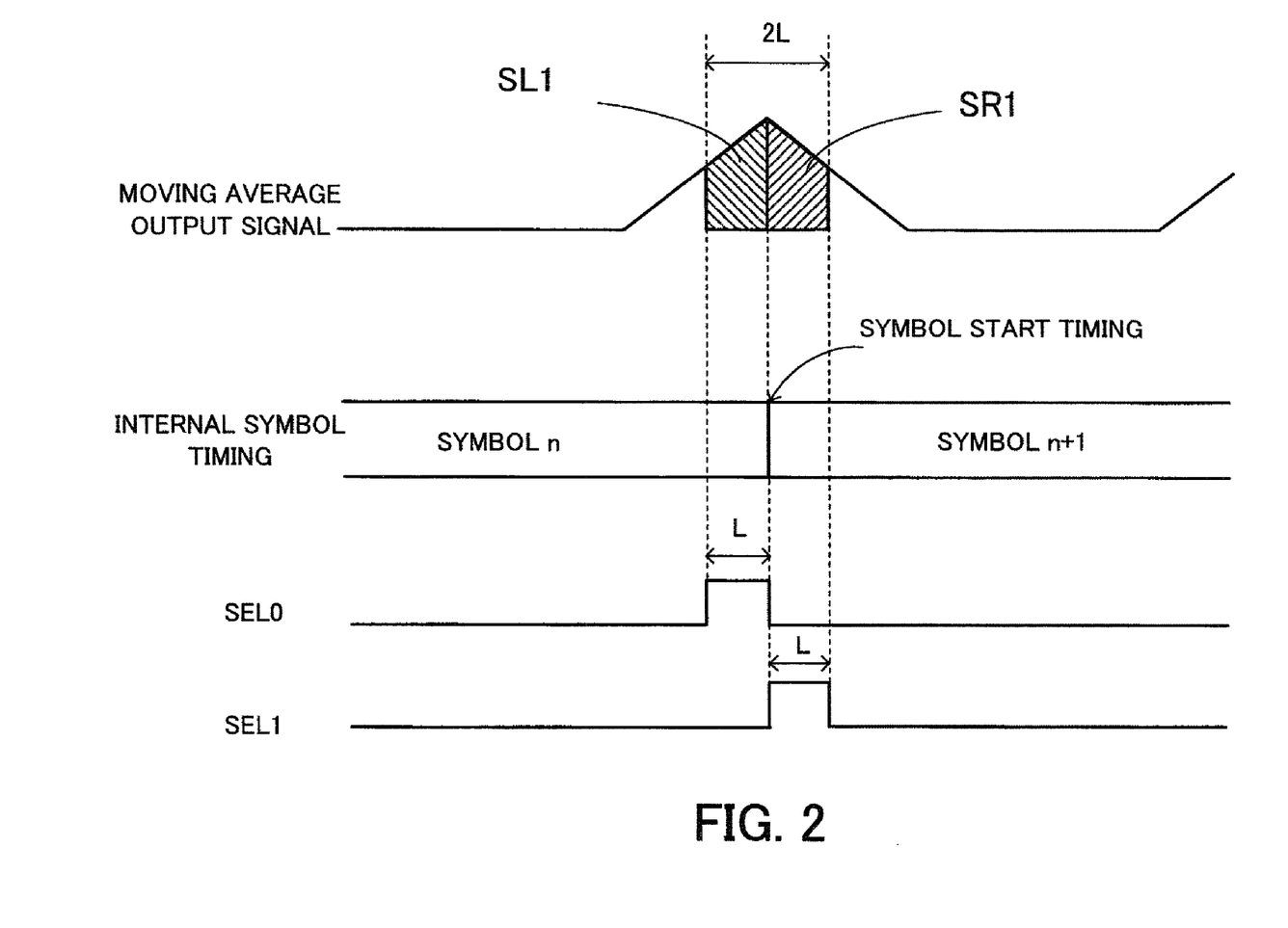
FIG. 2 illustrates a moving average output signal, internal symbol timing of the receiver device, and control signals for performing accumulative additions.

FIG. 2 illustrates the moving average output signal, the internal symbol timing generated within the receiver device, and the control signals for performing the accumulative additions.

The figure shows the moving average output signal and the control signals SEL0 and SEL1 with reference to the transition from a symbol n to a symbol n+1 occurring at the internal symbol timing of the receiver device.

The error detection control signal generator 6 generates the control signal SEL0 whose level turns to H (High) during a period L (e.g., equal to the guard interval length) preceding the symbol n+1 start timing generated within the receiver device, the generated control signal being supplied to the accumulative adder 51. The accumulative adder 51 accumulatively adds up the values of the moving average output signal input during the period L preceding the symbol start timing. This makes it possible to obtain an area SL1 as the sum of values of the moving average output signal over the period L preceding the symbol start timing. The level of the control signal SEL0 turns to L (Low) at the symbol start timing, so that the accumulative adder 51 stops the addition and holds the sum obtained.

Then, the error detection control signal generator 6 generates the control signal SEL1 of which the level turns to H during the period L succeeding the symbol start timing, the generated control signal being supplied to the accumulative adder 52. The accumulative adder 52 accumulatively adds up the values of the moving average output signal input during the period L succeeding the symbol start timing. This makes it possible to obtain an area SR1 as the sum of values of the moving average output signal over the period L succeeding the symbol start timing. After the lapse of the period L, the level of the control signal SEL1 turns to L, so that the accumulative adder 52 stops the addition and holds the sum obtained.

After the sums of signal values before and after the symbol start timing are obtained, the error signal generator 53 divides the difference (SL1−SR1) between the sums obtained from the respective accumulative adders 51 and 52 by the sum total (total area: SL1+SR1) of the two sums, to generate a normalized error signal. Where the peak of the moving average output signal coincides with the symbol start timing generated within the receiver device as shown in FIG. 2, the sums obtained from the accumulative adders 51 and 52, that is, the areas SL1 and SR1, are equal to each other. Accordingly, the difference (SL1−SR1)=0, and the error signal also is zero ("0"). In this case, it is judged that the symbol timing of the received signal and that generated within the receiver device are synchronized, and thus no clock control is carried out by the controller 7.

Figure 3A:
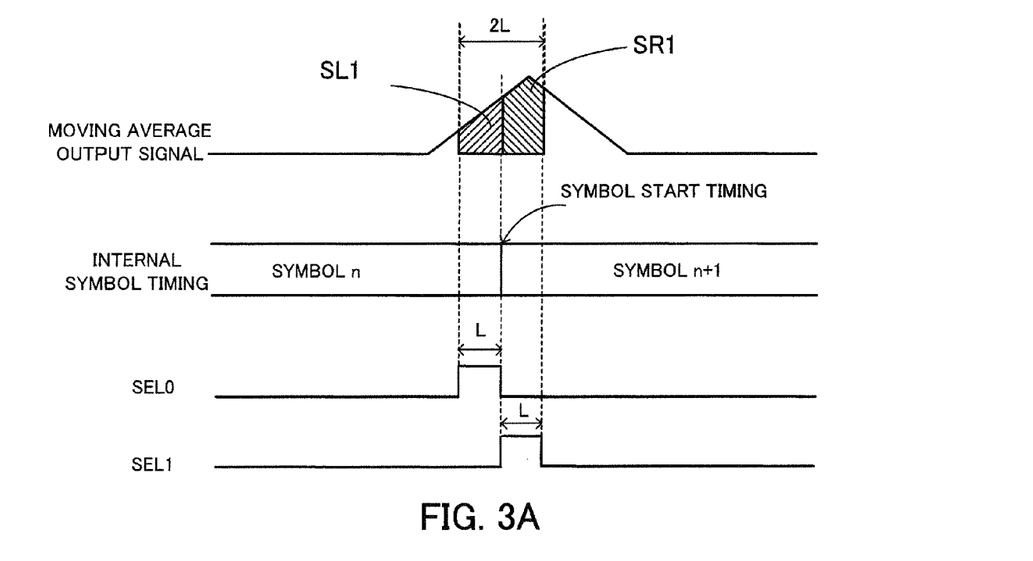
Figure 3B:
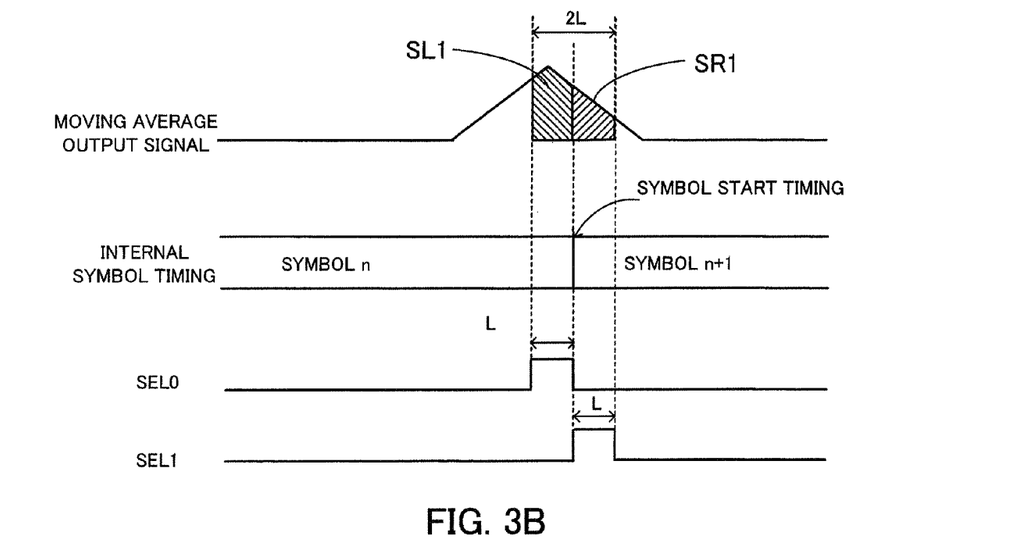

FIGS. 3A and 3B illustrate how timing error is detected in cases where the symbol timing of the receiver device is deviated from that of the received signal, wherein FIG. 3A shows the case where the symbol timing of the receiver device is advanced, and FIG. 3B shows the case where the symbol timing of the receiver device is retarded.

Where the symbol timing of the receiver device is advanced, the area SR1 is larger than the area SL1, as shown in FIG. 3A, and accordingly, the difference (SL1−SR1) takes a negative value. Also, the normalized error signal (SL1−SR1)/(SL1+SR1) takes a negative value. In this case, the controller 7 controls the clock in accordance with the error signal, to retard the sampling frequency so that the symbol timing of the receiver device may coincide with that of the received signal.

On the other hand, where the symbol timing of the receiver device is retarded, the area SL1 is larger than the area SR1, as shown in FIG. 3B, and therefore, the difference (SL1−SR1) takes a positive value. Also, the normalized error signal (SL1−SR1)/(SL1+SR1) takes a positive value. In this case, the controller 7 controls the clock in accordance with the error signal, to advance the sampling frequency so that the symbol timing of the receiver device may coincide with that of the received signal.

Figure 4A:
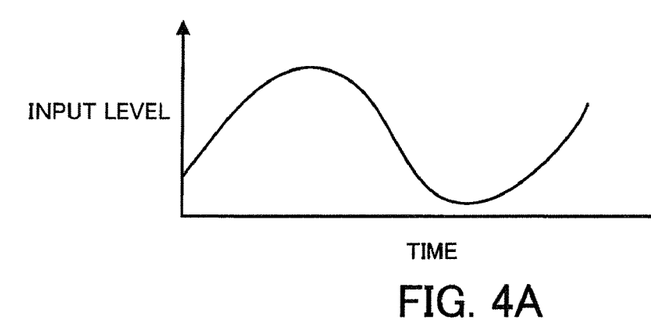
Figure 4B:
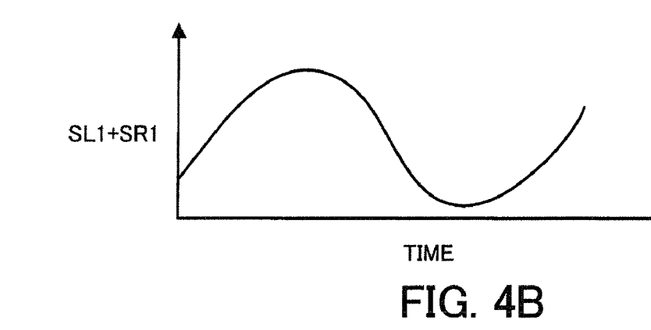
Figure 4C:
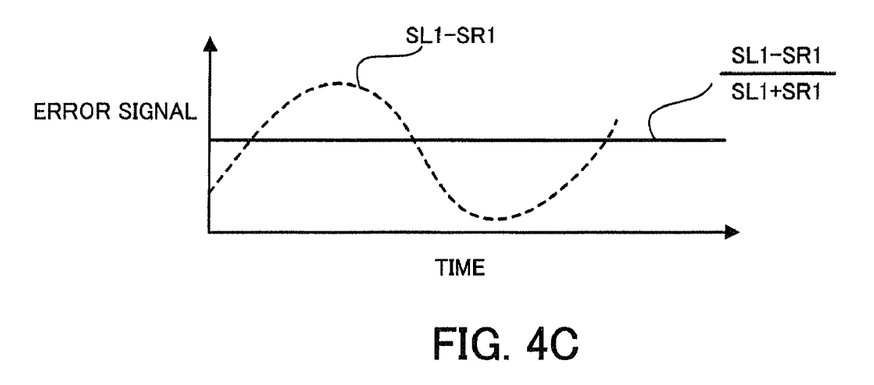

FIGS. 4A to 4C illustrate how the individual signals change when the input level of the received signal varies, wherein FIG. 4A shows change of the received signal, FIG. 4B shows change of the total area (SL1+SR1), and FIG. 4C shows change of the error signal.

Where the input level of the received signal varies as shown in FIG. 4A, the difference (SL1−SR1), which is used as the error signal in conventional receiver devices, also varies in proportion to the input level, as shown in FIG. 4C, because the correlation signal output from the correlator 3 is proportional to the input level. In the receiver device according to the embodiment, by contrast, the difference (SL1−SR1) is normalized by the total area (SL1+SR1), utilizing the fact that the total area (SL1+SR1) is proportional to the input level, as shown in FIG. 4B. Consequently, an error signal that remains constant irrespective of variation of the input level is output, as shown in FIG. 4C.

Thus, in the receiver device of this embodiment, the difference between the two sums of values of the moving average output signal acquired over the respective periods L before and after the symbol start timing is normalized by using the sum total of the two sums, and accordingly, an error signal with a constant output level can be generated independently of variation in the input level of the received signal. This makes it possible to correct with enhanced accuracy the timing error between the symbol timing generated within the receiver device and that of the received signal.

Also, since the areas SL1 and SR1 are calculated by the accumulative adders 51 and 52, the error detector 5 can be implemented using a small-scale circuit configuration including only a few adders.

A specific circuit configuration of the error detector 5 will be now explained with reference to FIG. 5.

In the error detector 5, the accumulative adders 51 and 52 respectively include selectors 51a and 52a, adders 51b and 52b, and latches (flip-flops (FFs)) 51c and 52c.

The selector 51a, 52a selects either the value of the moving average output signal input thereto from the integrator 4 in FIG. 1, or the value "0" in accordance with the control signal SEL0, SEL1 and outputs the selected value.

The adder 51b, 52b adds together the value output from the selector 51a, 52a and the value held by the latch 51c, 52c.

The latch Sic, 52c holds the sum obtained by the adder 51b, 52b.

The error signal generator 53 includes a subtracter 53a, an adder 53b, and a divider 53c.

The subtracter 53a calculates the difference (SL1−SR1) between the area SL1, which is the sum obtained from the accumulative adder 51, and the area SR1, which is the sum obtained from the accumulative adder 52.

The adder 53b calculates the sum (total area) (SL1+SR1) of the areas SL1 and SR1.

The divider 53c calculates the error signal (SL1−SR1)/(SL1+SR1) by normalizing the difference (SL1−SR1) with the use of the total area (SL1+SR1).

Figure 5:
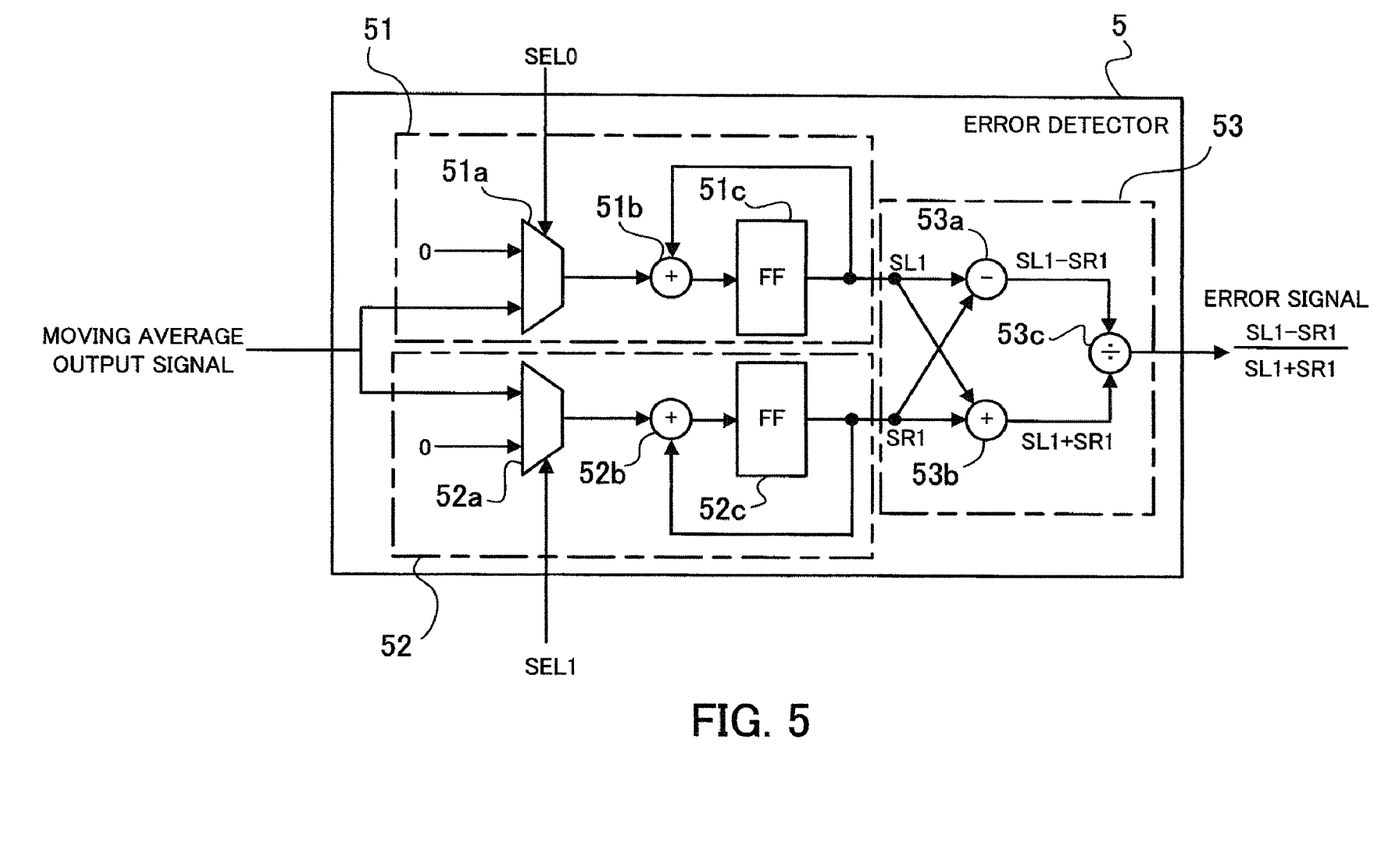
FIG. 5 illustrates a circuit configuration of an error detector.

Operation of the error detector 5 shown in FIG. 5 will be now described.

During the period L preceding the symbol start timing of the receiver device, the levels of the control signals SEL0 and SEL1 are H and L, respectively, as shown in FIGS. 2 and 3. Thus, during this period, the selector 51a selects and outputs the value of the moving average output signal while the selector 52a selects and outputs the value "0". Accordingly, the adder 51b and the latch 51c of the accumulative adder 51 accumulatively add up the values of the moving average output signal to calculate the area SL1. During the period L preceding the symbol start timing of the receiver device, the adder 52b of the accumulative adder 52 is input with "0", and therefore, the output of the accumulative adder 52 is "0".

On the other hand, during the period L succeeding the symbol start timing of the receiver device, the levels of the control signals SEL0 and SEL1 are L and H, respectively. Thus, during this period, the selector 51a selects and outputs the value "0" while the selector 52a selects and outputs the value of the moving average output signal. Consequently, although the accumulative adder 51 keeps outputting the area SL1, the adder 52b and the latch 52c of the accumulative adder 52 accumulatively add up the values of the moving average output signal to calculate the area SR1.

The areas SL1 and SR1 calculated by the accumulative adders 51 and 52 are input to the subtracter 53a of the error signal generator 53 where the difference (SL1−SR1) is calculated, and also input to the adder 53b where the total area (SL1+SR1) is calculated. The difference (SL1−SR1) and the total area (SL1+SR1) are input to the divider 53c, which then calculates the error signal (SL1−SR1)/(SL1+SR1) and outputs the obtained signal.

Thus, in the error detector 5 of this embodiment, each accumulative adder 51, 52 requires only one adder 51b, 52b, and the error signal with a constant output level can be generated using such a small-scale circuit configuration without being influenced by variation of the input level.

According to the present invention, the correlation signal calculated from the received signal is integrated, and the difference between the two sums (areas) of integral values obtained during the respective predetermined periods before and after the symbol start timing generated within the receiver device is normalized with the use of the sum total (total area) of the two sums. Accordingly, an error signal with a constant output level can be generated irrespective of variation in the input level of the received signal. This makes it possible to correct with enhanced accuracy the timing error between the symbol timing generated within the receiver device and that of the received signal.

Also, the two accumulative adders accumulatively add up the integral values of the correlation signal calculated during the respective predetermined periods before and after the symbol start timing generated within the receiver device, whereby error detection can be implemented using a small-scale circuit configuration including only a few adders.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A receiver device for receiving an orthogonal frequency division multiplexed signal, comprising:
a delayer for delaying the received signal for one effective symbol period;
a correlator for calculating a correlation signal from a product of the received signal and the delayed received signal;
an integrator for calculating an integral value of the correlation signal;
a first accumulative adder for accumulatively adding up the integral values over a predetermined period preceding symbol start timing generated within the receiver device;
a second accumulative adder for accumulatively adding up the integral values over a predetermined period succeeding the symbol start timing; and
an error signal generator for generating an error signal by normalizing a difference between a first sum obtained from the first accumulative adder and a second sum obtained from the second accumulative adder by means of a sum total of the first and second sums.

2. The receiver device according to claim 1, further comprising an error detection control signal generator for generating control signals to cause the first accumulative adder to execute the accumulative addition during the predetermined period preceding the symbol start timing, and to cause the second accumulative adder to execute the accumulative addition during the predetermined period succeeding the symbol start timing.

3. The receiver device according to claim 2, wherein each of the first and second accumulative adders includes a selector for selecting and outputting one of the integral value or zero in accordance with the control signal, a holding circuit for holding an accumulated value, and an adder for adding together the value held by the holding circuit and the value output from the selector and supplying a sum obtained to the holding circuit.

4. The receiver device according to claim 1, wherein the predetermined period has a length equal to a guard interval length.

5. An error detection circuit for detecting an error between symbol timing of an orthogonal frequency division multiplexed signal received by a receiver device and symbol timing generated within the receiving device, the error detection circuit comprising:
a first accumulative adder for accumulatively adding up integral values of a correlation signal over a predetermined period preceding symbol start timing generated within the receiver device, the correlation signal being calculated from a product of the received signal and a delayed signal obtained by delaying the received signal for one effective symbol period;
a second accumulative adder for accumulatively adding up the integral values of the correlation signal over a predetermined period succeeding the symbol start timing; and
an error signal generator for generating an error signal by normalizing a difference between a first sum obtained from the first accumulative adder and a second sum obtained from the second accumulative adder by means of a sum total of the first and second sums.

6. The error detection circuit according to claim 5, wherein control signals are input to the first and second accumulative adders to cause the first accumulative adder to execute the accumulative addition during the predetermined period preceding the symbol start timing, and to cause the second accumulative adder to execute the accumulative addition during the predetermined period succeeding the symbol start timing.

7. The error detection circuit according to claim 6, wherein each of the first and second accumulative adders includes a selector for selecting and outputting one of the integral value or zero in accordance with the control signal, a holding circuit for holding an accumulated value, and an adder for adding together the value held by the holding circuit and the value output from the selector and supplying a sum obtained to the holding circuit.

8. The error detection circuit according to claim 5, wherein the error signal generator includes a subtractor for calculating the difference, an adder for calculating the sum total of the first and second sums, and a divider for dividing the difference by the sum total calculated by the adder.

9. The error detection circuit according to claim 5, wherein the predetermined period has a length equal to a guard interval length.

10. A receiving method for receiving an orthogonal frequency division multiplexed signal, comprising:
(a) delaying the received signal for one effective symbol period;
(b) calculating a correlation signal from a product of the received signal and the delayed received signal;
(c) calculating an integral value of the correlation signal;

(d) accumulatively adding up, by a first accumulative adder, the integral values over a predetermined period preceding symbol start timing generated within a receiver device;

(e) accumulatively adding up, by a second accumulative adder, the integral values over a predetermined period succeeding the symbol start timing; and (f) generating an error signal by normalizing a difference between a first sum obtained from the first accumulative adder and a second sum obtained from the second accumulative adder by means of a sum total of the first and second sums.

11. The receiving method according to claim 10, wherein in (d), a control signal is input to the first accumulative adder to cause the first accumulative adder to execute the accumulative addition during the predetermined period preceding the symbol start timing, and in (e), a control signal is input to the second accumulative adder to cause the second accumulative adder to execute the accumulative addition during the predetermined period succeeding the symbol start timing.

12. The receiving method according to claim 11, wherein each of the first and second accumulative adders performs the accumulative addition by selecting one of the integral value or zero in accordance with the control signal, adding the selected value to a value held by a holding circuit for holding an accumulated value, and causing the holding circuit to hold a sum obtained.

13. The receiving method according to claim 10, wherein the predetermined period has a length equal to a guard interval length.

* * * * *